March 27, 1962 — H. G. YODER — 3,026,975
BRAKE SYSTEM
Filed May 25, 1959 — 2 Sheets-Sheet 1
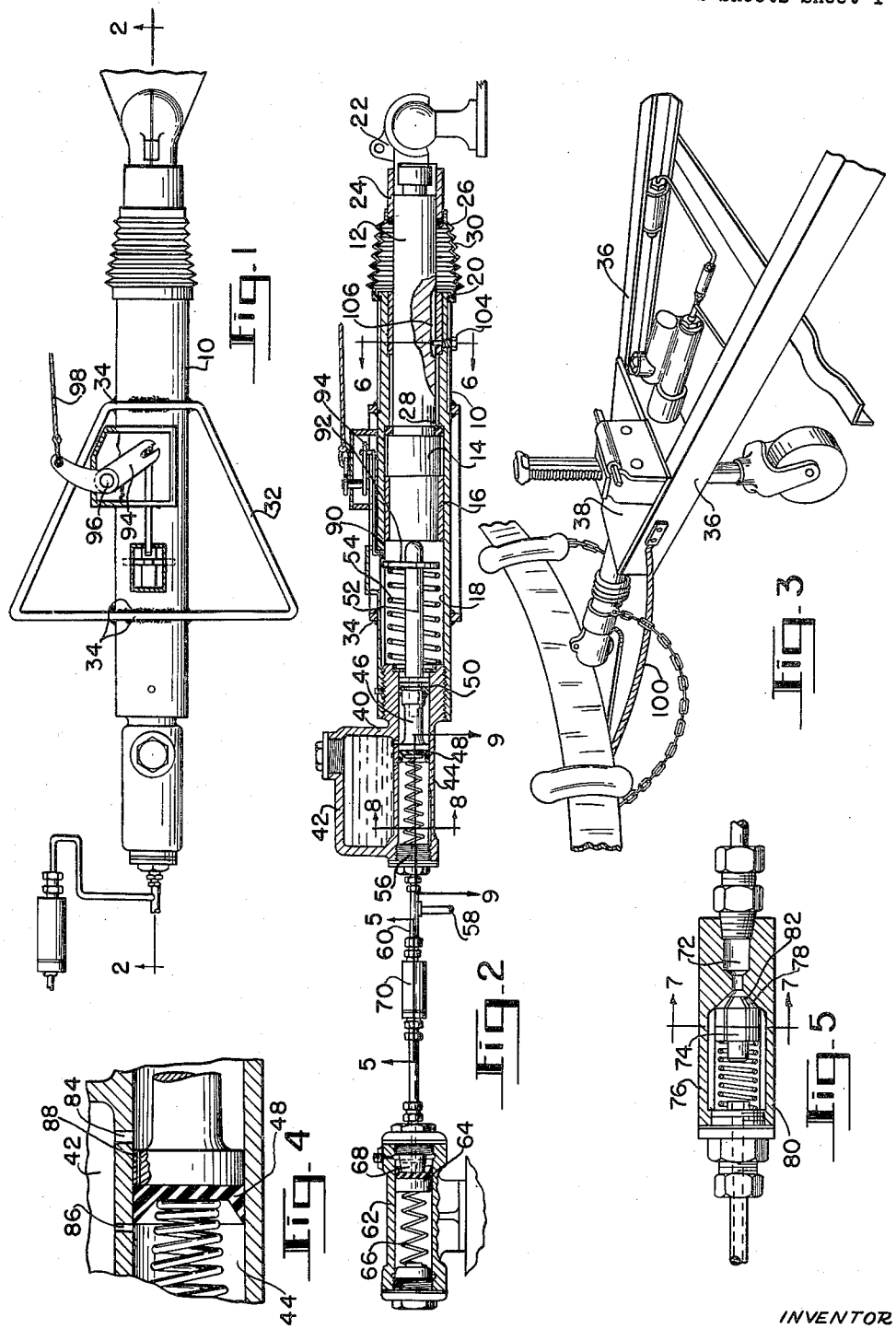
INVENTOR
HERBERT G. YODER
By M. A. Hobbs
ATTORNEY March 27, 1962
H. G. YODER
3,026,975
BRAKE SYSTEM
Filed May 25, 1959
2 Sheets-Sheet 2
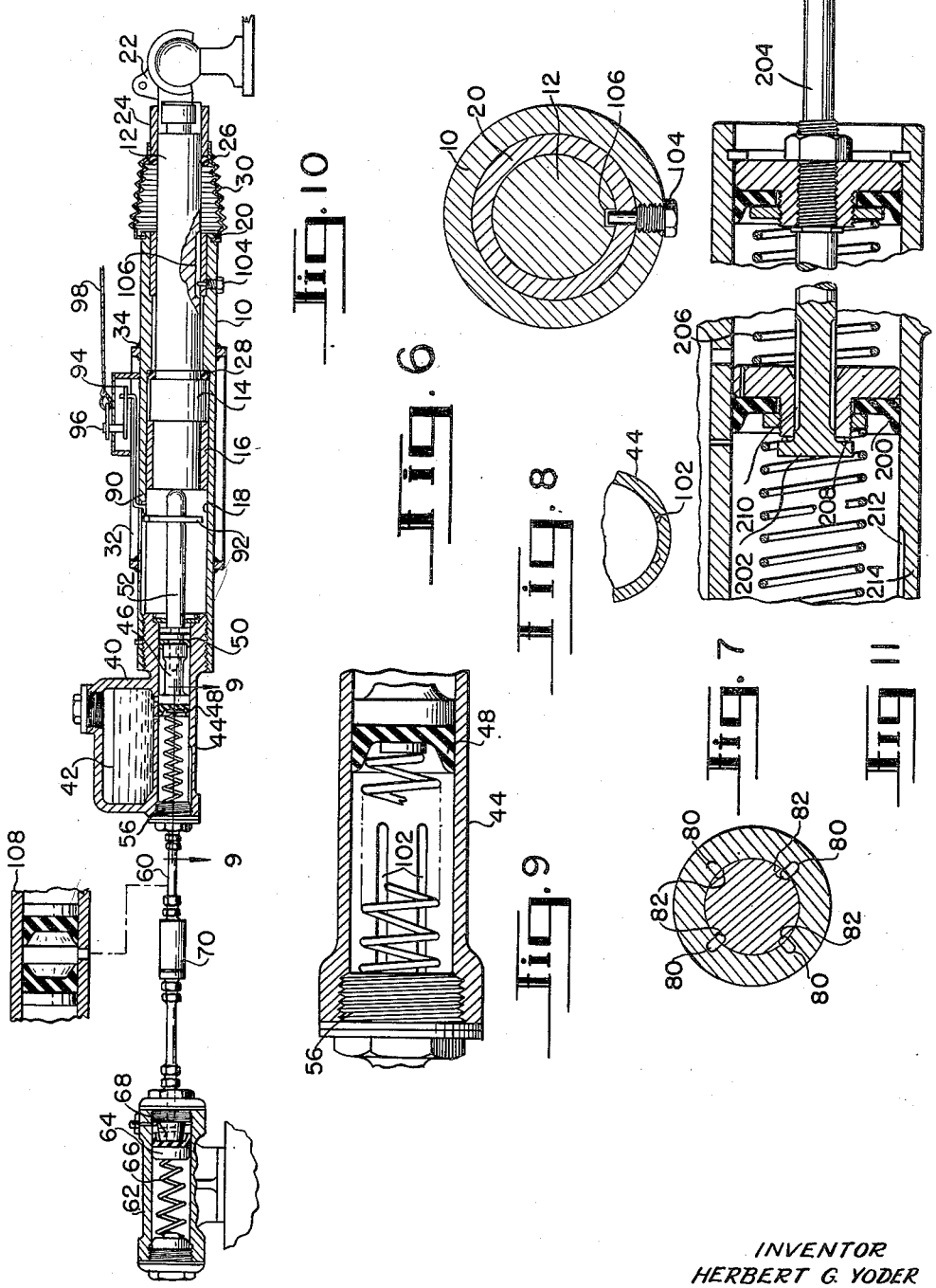
INVENTOR
HERBERT G. YODER
By M. A. Hobbs
ATTORNEY United States Patent Office 3,026,975
Patented Mar. 27, 1962

3,026,975
BRAKE SYSTEM
Herbert G. Yoder, % Ludlow Machine Products,
R.F.D. 3, Bellefontaine, Ohio
Filed May 25, 1959, Ser. No. 815,663
3 Claims. (Cl. 188—112)

This invention relates to hitches for connecting a trailer with a towing vehicle and particularly to such a hitch having incorporated therein mechanism which will automatically operate the brakes of the trailer upon movement of the trailer and the towing vehicle toward each other.

This invention is of the same general nature as the invention disclosed in my issued Patent No. 2,571,323, but is a further refinement and embodies new and advantageous features beyond the scope of the said issued patent.

A particular object of the present invention is the provision of an improved hitch bar particularly adapted for being incorporated in a trailer structure for connecting the trailer with a towing vehicle.

Another object is the provision of a hitch bar for connecting a trailer with a towing vehicle which includes mechanism for actuating the brakes of the trailer when the hitch bar is collapsed by the trailer running ahead of the vehicle.

A particular object is an improved hitch bar of the nature referred to in which the backing of the towing vehicle and trailer can be accomplished without making any adjustments in the trailer brakes or the actuating mechanism therefor contained within the hitch bar.

A still further object is the provision of a combined hitch bar-brake actuating device having a connection with the emergency brakes of the towing vehicle, so that setting of the said emergency brakes will also operate to set the trailer brakes.

Still another object of this invention is the provision of an arrangement of the nature referred to in which the trailer brakes are released when the trailer and towing vehicle are backed, and wherein the said trailer brakes remain released for a brief period of time to permit both forward and backing movements for manipulating the trailer into position without the said brakes interfering.

These and other objects and advantages will become more apparent upon reference to the following description taken in connection with the accompanying drawings, in which:

FIGURE 1 is a plan view showing a hitch bar according to my invention;

FIGURE 2 is a vertical sectional view indicated by line 2—2 on FIGURE 1;

FIGURE 3 is a perspective view showing the hitch bar mounted in a trailer chassis;

FIGURE 4 is a detail showing a portion of the brake actuating mechanism drawn at larger scale than in FIGURE 2;

FIGURE 5 is a sectional view, indicated by line 5—5 on FIGURE 2, showing the construction of a resistance type check valve that can be employed in the system of my invention;

FIGURE 6 is a sectional view indicated by line 6—6 on FIGURE 2;

FIGURE 7 is a sectional view indicated by line 7—7 on FIGURE 5;

FIGURE 8 is a fragmentary sectional view indicated by line 8—8 on FIGURE 2;

FIGURE 9 is a sectional view indicated by line 9—9 on FIGURE 2;

FIGURE 10 is a sectional view similar to FIGURE 2, but showing a modification of the device in which a spring is eliminated; and FIGURE 11 is a sectional view showing a modified arrangement for releasing fluid from the brake system.

Referring to the drawings somewhat more in detail, on reference to FIGURES 1 and 2 it will be seen that the hitch bar according to my invention comprises an outer sleeve part 10, in which is reciprocably mounted a rod 12 having a head 14 adjacent one end. A bearing 16 on rod 12 adjacent said head 14 slidably guides rod 12 in bore 18 of sleeve 10, while another bearing 20 in the right end of the sleeve also guides the said rod. A suitable connector 22 is provided on the free end of rod 12 for effecting connection thereof with the towing vehicle.

Adjacent fitting 22 is a collar 24 and for the purpose of preventing the stresses from becoming too large when the rod 12 reaches the limits of its sliding movement in sleeve 10, there may be provided the rubber-like O-rings 26 adjacent the collar 24 and 28 adjacent head 14, as indicated in FIGURE 2.

Collar 24 also serves as a means for securing one end of the flexible sleeve or boot 30, the other end of which is fastened to the adjacent end of sleeve 10.

Arranged in the form of a regular trapezoid about sleeve 10 is a framework 32 welded to the sleeve, as indicated at 34, and forming the means for securing the hitch bar to a trailer frame, as indicated in FIGURE 3.

In FIGURE 3 it will be seen that the trailer frame consists of the spaced channels 36 converging forwardly, and on the ends of which channels there may be connected the tie plates 38. In the space between the tie plates and the channels, the configuration is such as to closely receive frame 32, whereby an extremely simple, but at the same time extremely strong connection can be made between the hitch bar and the trailer frame.

The left end of sleeve 10, as it is viewed in FIGURES 1 and 2, is threaded and receives a casting 40 having formed therein a reservoir chamber 42 and a master brake cylinder 44. Reciprocably mounted in cylinder 44 is a piston unit 46 having a primary cup 48 at its left end and a secondary cup 50 at its right end. The cups may be formed of rubber or rubber-like material according to practices well-known in the brake art.

Rod 52 projects rightwardly from the piston unit, so that its end is adjacent the left end of rod 12. At this point, it will be apparent that movements of rod 12 into sleeve 10 will bring about movement of rod 52 and the piston unit connected therewith so as to displace fluid from master cylinder 44 in a manner well-known in the hydraulic brake art. A spring 54 may be provided urging rod 52 rightwardly, and thereby also urging rod 12 rightwardly to its extended position. This spring 54 is relatively stiff, but under certain circumstances, can be eliminated entirely, as will be seen hereinafter.

The left end of master cylinder 44 is closed by a threaded cap 56 and a port opening through this cap is connected by a conduit 58 with the trailer brakes that are to be actuated and also by a conduit 60 with a unit 62 that comprises a cylinder having reciprocable therein a piston 64 which is under the influence of a spring 66.

Piston 64 is normally bottomed against the frustoconical inner part 68 of the closure cap at the right end of unit 62, and which frustoconical part is bored axially and transversely for admitting fluid into the interior of unit 62. It may be pointed out at this time that when piston 64 is in its FIGURE 2 position, the cylinder cup on the end thereof is pressed against the flat inner end of frustoconical part 68, whereby only a relatively small annular area of the cup is exposed to fluid pressure.

However, upon movement of the piston leftwardly under the influence of fluid pressure, the said cup will separate from the inner end of frustoconical part 68, thereby exposing a larger surface to be acted on by the fluid pressure.

Disposed in conduit 60 there may be a resistance check unit 70, shown in detail in FIGURES 5 and 7, and which merely comprises a through passage 72 having a valve member 74 therein which is urged by a spring 76 against a seat 78. When the flow is leftwardly through unit 70, valve member 74 lifts and fluid flow through the valve is relatively free through passages 80. When fluid flow through the unit is to the right, the valve member engages seat 78 and fluid flow through the valve is then resisted by being forced through the relatively small passages 82 in the valve member.

Communication of reservoir 42 with master cylinder 44 is effected through a larger port 84 (FIGURE 4) opening into the master cylinder behind primary cup 48 and also through a relatively small port 86 positioned immediately ahead of the said primary cup when the latter is in its rest or retracted position. The member 46, which is flanged to fit within the master cylinder immediately behind primary cup 48, is provided with a plurality of small axial holes 88 which permit movement of fluid from behind the said flanged portion to the back of the primary cup and then around the primary cup into master cylinder ahead of the said cup. Port 86 is principally useful as a bleeder port for permitting air bubbles to escape from master cylinder 48.

For actuating the trailer brakes when the trailer and towing vehicle are at rest, I may provide an auxiliary member 90 adapted to engage a collar 92 on rod 52 for moving the said rod independently of rod 12. Member 90 is connected with a lever 94 pivoted at 96 and having its free end connected by a cable 98 with the emergency brakes of the towing vehicle. This arrangement provides for the setting of the trailer brakes whenever the emergency brakes of the towing vehicle are set.

An alternative arrangement is illustrated in FIGURE 3, wherein a cable 100 is provided leading from a point on the frame of the trailer to the emergency brake mechanism of the towing vehicle. The arrangement of FIGURE 3 is principally useful when the towing vehicle is braked to a halt and the emergency brakes are then immediately set. The cable 100 serves to hold the trailer in its forward position relative to the towing vehicle and thus holds rod 12 in its inner position in sleeve 10 where the trailer brakes are actuated.

According to my invention, the master cylinder 48 is provided with axial grooves 102, best seen in FIGURE 9, and which are so arranged that when piston unit 46 is advanced to a predetermined point in master cylinder 44, the said grooves form a bypass around primary cup 48 and entirely relieve the fluid pressure acting on the trailer brakes, thus completely releasing the trailer brakes. These grooves can be relatively small and I have found that grooves on the order of twenty thousandths wide and fifty thousandths deep are adequate for the purpose of bypassing the primary cup, while at the same time there is little or no tendency for the primary cup to extrude into the grooves and be cut thereby.

For the purpose of preventing relative rotation between rod 12 and sleeve 10, a pilot screw 104 may be provided, as illustrated in FIGURE 6, extending into a slot 106 in the rod 12, and which slot is of sufficient length to permit the required relative movement between the rod and sleeve.

The arrangement in FIGURE 10 may be considered to be identical with the FIGURE 2 arrangement, except that the spring 54 is completely eliminated therefrom.

In operation, when the hitch according to my invention is mounted in a trailer frame, as indicated, and a towing vehicle connected therewith, any running ahead of the trailer relative to the towing vehicle will have a tendency to collapse the hitch and to displace fluid from the master cylinder in the hitch to the trailer brake cylinders, generally indicated at 108 in FIGURE 10. Under all normal operating conditions, piston unit 46 does not reciprocate far enough to permit grooves 102 to form a bypass around primary cup 48. Also, unit 62 is adjusted to be responsive to a higher pressure than will be encountered in normal braking operations, although, of course, the unit can serve at all times to provide a cushion to absorb momentary excessive braking pressures.

With a relatively heavy stable trailer, the unit illustrated in FIGURE 10, wherein the spring 54 is eliminated, can be employed. However with light trailers which are apt to bounce about a great deal, the FIGURE 2 arrangement utilizing the spring 54 is to be preferred because of the stabilizing influence the spring will have.

With either of the modifications illustrated when the towing vehicle is put in reverse to back the trailer, the hitch will first collapse, thereby setting the trailer brakes, and then pressure will be built up on the brake fluid until piston 64 moves into its cylinder thereby relieving the brake system of a certain amount of the fluid therein and permitting piston unit 46 to continue its movement until primary cup 48 is bypassed by grooves 102.

At this time there will be a sudden release of the pressure in the braking system and the trailer brakes will be released, whereupon it can readily be backed. The action described above takes place very quickly with the organization of my invention, and with substantially no shock so that the trailer can be backed under any circumstances quite readily, and, generally, without the vehicle operator even noticing the instant that the trailer brakes are released.

In certain instances it may be desirable to make the spring 54 strong enough to sustain normal backing thrusts on level ground, but whether the spring is made of this strength or only of sufficient strength to stabilize the trailer, makes little difference in the operation of my device so far as the releasing of the trailer brakes is concerned.

While the operation of my device is sufficiently smooth and shock-free that a trailer could be manipulated to and fro with the brakes being released automatically on each backing movement, it may in certain instances be preferable to include the resistance check unit 70 in series with the unit 62, and which will delay the return of the fluid in unit 62 to the braking system for a short period of time, say, ten seconds, and which would prevent the brake system from becoming operative between backing movements.

The arrangement of the small holes 88 behind primary cup 48 is also useful in retarding the return of the braking system to normal operation under these circumstances.

In FIGURE 11, primary cup 200 is held against head 202 of actuating rod 204 by spring 206 which is prestressed to yield only when the pressure on the face of the cup exceeds brake setting pressure by a substantial amount.

Head 202 has rubber-like ring 208 which seals against the holder for cup 200 so in normal operation the entire piston assembly moves as a single unit. Rod 204 has grooves 210 therein which provide a bypass around cup 200 when the cup and its holder move on the rod due to pressure building up ahead of the cup to the value required to collapse the spring.

When the bypass is opened, the cup can move ahead until it passes the end of groove means 212 in the cylinder 214 and at which time the brake system is exhausted in the manner already described.

It will be understood that this invention is susceptible to modification in order to adapt it to different usages and conditions, and, accordingly, it is desired to comprehend such modifications within this invention as may fall within the scope of the appended claims.

I claim:

1. In a brake system for a trailer having wheel brakes and a power driven vehicle for towing the same, a hitch means connecting said trailer with said vehicle, said hitch means comprising telescoping members, a master brake cylinder, a fluid reservoir in communication with said cylinder for supplying fluid thereto, a piston in said cylinder which is reciprocable to displace fluid therefrom to actuate said trailer wheel brakes, means for moving said piston to a fluid displacing position responsive to collapsing of said telescoping means upon substantial relative movement of said trailer with respect to said vehicle, while hitched thereto, said piston having a primary cup at one end and a secondary cup at the other end, said secondary cup being disposed to prevent flow of fluid into said hitch telescoping members, axially spaced port openings in said master brake cylinder, said port openings being in communication with said fluid reservoir, means in said cylinder for urging said piston to a non-fluid displacing position, one of said ports being positioned ahead of said primary cup and the other behind the same when said piston is in the said non-fluid displacing position, a discharge port in the end of said master brake cylinder forward of said primary cup, a conduit connected to said discharge port, a second conduit means connected to said discharge port conduit which communicates with said trailer wheel brakes, and an axial by-pass groove in the side wall of said master brake cylinder extending from said discharge port end to a point forwardly of said master brake cylinder ports which communicates with said fluid reservoir, a resistance fluid check unit means connected to said discharge port conduit for restricting the flow of fluid therethrough and controlling the fluid pressure applied to said trailer wheel brakes, and means connected to said unit means for receiving and retarding the flow of fluid from and to the same and effecting the flow of fluid to the trailer wheel brakes.

2. In a brake system for trailers as set forth in claim 1, and wherein means is provided extending between said power vehicle and said piston for actuating said piston and said trailer wheel brakes independently of said collapsing telescoping members of said hitch.

3. In a brake system for trailers as set forth in claim 1, and wherein an operating cable extends between said power vehicle and said piston for actuating said piston and said trailer wheel brakes during an emergency and independently of said collapsing telescoping members of said hitch.

References Cited in the file of this patent

UNITED STATES PATENTS

| | | |
|---|---|---|
| 880,257 | Welch | Feb. 25, 1908 |
| 2,149,188 | Shaffer | Feb. 28, 1939 |
| 2,149,189 | Shaffer | Feb. 28, 1939 |
| 2,258,876 | Banning | Oct. 14, 1941 |
| 2,385,891 | Swanson | Oct. 2, 1945 |
| 2,407,156 | Horne | Sept. 3, 1946 |
| 2,463,896 | Messier | Mar. 8, 1949 |
| 2,571,323 | Yoder | Oct. 16, 1951 |
| 2,642,961 | Teal | June 23, 1953 |
| 2,693,251 | Hall | Nov. 2, 1954 |
| 2,698,069 | Henry | Dec. 28, 1954 |
| 2,746,574 | Smith et al. | May 22, 1956 |
| 2,834,436 | Davids | May 13, 1958 |
| 2,921,652 | Smith | Jan. 19, 1960 |

FOREIGN PATENTS

| | | |
|---|---|---|
| 876,216 | Germany | May 11, 1953 |